US012748762B2

(12) United States Patent
Das et al.

(10) Patent No.: US 12,748,762 B2
(45) Date of Patent: Sep. 29, 2026

(54) TECHNIQUES FOR AUTOMATICALLY INFERRING INTENTS OF SEARCH QUERIES

(71) Applicant: NETFLIX, INC., Los Gatos, CA (US)

(72) Inventors: Sudeep Das, San Francisco, CA (US); Ivan Gennadievich Provalov, Scotts Valley, CA (US); Weidong Zhang, Cupertino, CA (US); Yi Zhang, Hayward, CA (US)

(73) Assignee: NETFLIX, INC., Los Gatos, CA (US)

( * ) Notice: Subject to any disclaimer, the term of this patent is extended or adjusted under 35 U.S.C. 154(b) by 27 days.

(21) Appl. No.: 18/299,674

(22) Filed: Apr. 12, 2023

(65) Prior Publication Data

US 2023/0334055 A1 Oct. 19, 2023

Related U.S. Application Data

(60) Provisional application No. 63/330,655, filed on Apr. 13, 2022.

(51) Int. Cl.
*G06F 16/2457* (2019.01)
*G06F 16/28* (2019.01)

(52) U.S. Cl.
CPC ...... *G06F 16/24578* (2019.01); *G06F 16/285* (2019.01)

(58) Field of Classification Search
CPC ......................... G06F 16/24578; G06F 16/285
(Continued)

(56) References Cited

U.S. PATENT DOCUMENTS 8,694,529 B1 * 4/2014 Hotchkies ............. G06F 16/951 707/766
9,015,143 B1 * 4/2015 Sahin .................. G06F 16/3325 707/765

(Continued)

FOREIGN PATENT DOCUMENTS

CN 110347701 A * 10/2019 ......... G06F 16/2452
JP 4420589 B2 * 2/2010 ....... G06F 17/30899

OTHER PUBLICATIONS

Das et al., "Query Facet Mapping and its Applications in Streaming Services: the Netflix Case Study", Proceedings of the 45th International Acm Sigir Conference on Research and Development in Information Retrieval (SIGIR '22), Jul. 11-15, 2022, Madrid, Spain, pp. 3393-3397. (Year: 2022).*

(Continued)

*Primary Examiner* — Phuong Thao Cao
(74) *Attorney, Agent, or Firm* — Artegis Law Group, LLP

(57) ABSTRACT

In various embodiments, an intent-based query processing application processes search queries. The intent-based query processing application computes lexical similarity scores between a search query and a set of entities. The intent-based query processing application computes entity relevance scores based on the lexical similarity scores and user engagement scores associated with both the search query and the set of entities. The intent-based query processing application computes a first category relevance score associated with both the search query and a first category based on the entity relevance scores. The intent-based query processing application determines an intent associated with the search query based on the first category relevance score. The intent-based query processing application generates a response to the search query based on the intent.

19 Claims, 3 Drawing Sheets

(58) Field of Classification Search
USPC .......................................................... 707/728
See application file for complete search history.

(56) References Cited

U.S. PATENT DOCUMENTS

| | | | | |
|---|---|---|---|---|
| 9,015,152 | B1 * | 4/2015 | Schogol | G06F 16/9538 707/723 |
| 9,817,986 | B1 * | 11/2017 | Barrilleaux | G06F 21/6218 |
| 9,830,392 | B1 * | 11/2017 | Garg | G06F 16/9535 |
| 11,650,996 | B1 * | 5/2023 | Daianu | G06N 20/00 707/771 |
| 12,026,203 | B1 * | 7/2024 | Anubhai | G06F 16/9024 |
| 2005/0289140 | A1 * | 12/2005 | Ford | G06F 16/951 707/999.005 |
| 2007/0073641 | A1 * | 3/2007 | Perry | G06F 16/335 |
| 2011/0307482 | A1 * | 12/2011 | Radlinski | G06F 16/9535 707/E17.084 |
| 2012/0259844 | A1 * | 10/2012 | Yuan | G06F 16/9535 707/723 |
| 2012/0310929 | A1 * | 12/2012 | Patterson | G06F 16/9536 707/E17.084 |
| 2014/0280101 | A1 * | 9/2014 | Stipins, III | G06F 16/3347 707/724 |
| 2015/0039580 | A1 * | 2/2015 | Subhedar | G06F 8/61 707/706 |
| 2015/0193682 | A1 * | 7/2015 | Baughman | G06F 16/2365 707/728 |
| 2015/0348160 | A1 * | 12/2015 | Ravikant | G06Q 30/0627 705/26.63 |
| 2016/0034471 | A1 * | 2/2016 | Radlinski | G06F 16/248 707/728 |
| 2016/0179953 | A1 * | 6/2016 | Klotz, Jr | G06F 16/24565 707/722 |
| 2016/0188599 | A1 * | 6/2016 | Maarek | G06F 16/90335 707/728 |
| 2016/0239577 | A1 * | 8/2016 | Broman | G06F 16/9535 |
| 2018/0218430 | A1 * | 8/2018 | Prendki | G06Q 30/0641 |
| 2019/0179962 | A1 * | 6/2019 | Khan | G06F 16/24578 |
| 2019/0205472 | A1 * | 7/2019 | Kulkarni | G06F 3/04812 |
| 2019/0318388 | A1 * | 10/2019 | Sun | G06Q 90/00 |
| 2020/0097560 | A1 * | 3/2020 | Kulkarni | G06Q 30/0201 |
| 2020/0380041 | A1 * | 12/2020 | Aher | G06F 16/90332 |
| 2022/0108380 | A1 * | 4/2022 | Bilotta | G06Q 30/0607 |
| 2022/0245162 | A1 * | 8/2022 | Wang | G06F 16/24578 |
| 2022/0245706 | A1 * | 8/2022 | Chaidaroon | G06N 3/09 |
| 2022/0398643 | A1 * | 12/2022 | Sivakumar | G06F 18/217 |
| 2024/0257205 | A1 * | 8/2024 | Upreti | G06Q 30/0641 |

OTHER PUBLICATIONS

Wu et al., "Identification of Web Query Intent Based on Query Text and Web Knowledge", 2010 First International Conference on Pervasive Computing, Signal Processing and Applications, Sep. 17-19, 2010, Harbin, China, pp. 128-131. (Year: 2010).*

Chen et al., "Bringing Order to the Web: Automatically Categorizing Search Results", In CHI 2000, vol. 2, Issue 1, Apr. 1-6, 2000, pp. 145-152.

Hosey et al., "Just Give Me What I Want: How People Use and Evaluate Music Search", In Proceedings of the 2019 CHI Conference on Human Factors in Computing Systems, https://doi.org/10.1145/3290605.3300529, May 4-9, 2019, pp. 1-12.

Lamkhede et al., "Challenges in Search on Streaming Services: Netflix Case Study", Association for Computing Machinery, arXiv:1903.04638, Jul. 21-25, 2019, 4 pages.

Lamkhede et al., "Recommendations and Results Organization in Netflix Search", Manuscript Submitted to ACM, arXiv:2105.14134, May 28, 2021, pp. 1-5.

Provalov, Ivan, "Global Languages Support at Netflix", Testing Search Queries, Retrieved from https://medium.com/netflix-techblog/global-languages-support-at-netflix-testingsearch-queries-ede40f7d93d3, Jul. 12, 2016, pp. 1-10.

Leichtman Research Group, "64% of U.S. Households Have an SVOD Service", Retrieved from https://www.leichtmanresearch.com/wp-content/uploads/2017/07/LRG-Press-Release-2017-07-24.pdf, Jul. 24, 2017, 2 pages.

Jiang et al., "Degenerate Feedback Loops in Recommender Systems", Association for the Advancement of Artificial Intelligence, arXiv:1902.10730, Mar. 27, 2019, pp. 1-10.

* cited by examiner

TECHNIQUES FOR AUTOMATICALLY INFERRING INTENTS OF SEARCH QUERIES

CROSS-REFERENCE TO RELATED APPLICATIONS

This application claims priority benefit of the United States Provisional Patent Application titled, "PROCESSING SEARCH QUERIES BASED ON LEXICAL SIMILARITY AND BEHAVIORAL SIGNALS," filed on Apr. 13, 2022 and having Ser. No. 63/330,655. The subject matter of this related application is hereby incorporated herein by reference.

BACKGROUND

Field of the Various Embodiments

The various embodiments relate generally to computer science and to data search and retrieval and, more specifically, to techniques for automatically inferring intents of search queries.

Description of the Related Art

A graphical user interface (GUI) for a typical streaming media service provides a variety of mechanisms to enable a user to select a media title of interest to the user from a catalog of media titles and to control the playback of the selected media title for viewing. In addition to automatically generating and presenting personalized recommendations of media titles, a typical GUI allows a user to enter search queries to control the exploration of the catalog of media titles more directly. As a user enters an intended search query, each keystroke generates a new search query and responses to each search query are interactively displayed via the GUI. Because the responses to search queries directly impact the ability of a given user to select a media title of interest to that user, responding appropriately and informatively to each search query is an important aspect of the overall media streaming experience.

In one approach to responding to a search query, a search engine computes lexical scores between the search query and each media title in a catalog of media titles based on the term frequency-inverse document frequency (TF-IDF) scores of each word in the search query. The TF-IDF score for a given media title and a given word is the product of a term frequency (TF) within the media title and an inverse document frequency (IDF) within all the media titles in the catalog. The TF is equal to the number of repetitions of the word in the given media title divided by the number of words in the search query. The IDF is a measure of how important a given word is in the catalog of media titles and is equal to the logarithm of the total number of media titles in the catalog divided by the number media titles in the catalog that contain the word. To compute a lexical score between the search query and a given media title, the search engine aggregates the TF-IDF score(s) for the media title and the word(s) in the search query. The search engine generates a query response that normally specifies one or more media titles having the highest lexical score(s).

One drawback of the above approach is that, for a given catalog of media titles, a significant percentage of search queries issued by users are not lexically related to any of the media titles in the catalog. More specifically, when searching for a media title to view, a given user may not know the actual media title he/she wants to view. In such cases, the user may enter an intended search query that specifies either a media title that is not in the catalog, the name of a movie director, the type of movie, or the name of some other entity instead of the name of an actual media title. When a search query partially or completely specifies these types of alternative entities, the associated query response can be uninformative and can be perceived as inappropriate and/or inaccurate by the user. For example, if a user were to enter an intended search query specifying a well-known media title that is not included in the catalog of media titles, then each associated query response would include media titles that are lexically similar to the specified media title. Further, each associated query response normally would not provide any information explaining why the specified media title is not listed in the associated query response. Lexically similar media titles may not be of interest to a user, and the lack of explanation about why a specified media title is not included in a search result may frustrate a user. When search results do not provide media titles of interest to users, and there is no explanation as to why, users can end up concluding that the search mechanism is unreliable.

As the foregoing illustrates, what is needed in the art are more effective techniques for processing search queries.

SUMMARY

One embodiment sets forth a computer-implemented method for processing search queries. The method includes computing a set of lexical similarity scores between a search query and a set of entities; computing a set of entity relevance scores based on the set of lexical similarity scores and a set of user engagement scores associated with both the search query and the set of entities; computing a first category relevance score associated with both the search query and a first category based on the set of entity relevance scores; determining an intent associated with the search query based on the first category relevance score; and generating a response to the search query based on the intent.

At least one technical advantage of the disclosed techniques relative to the prior art is that, with the disclosed techniques, responses to search queries can account for the intents of those original search queries. In that regard, with the disclosed techniques, a category and an associated intent of a search query are automatically identified based on entity relevance scores across a variety of categories associated with any number of characteristics of in-catalog items and out-of-catalog items. Each entity relevance score reflects both a measure of lexical similarity between a different entity and the search query as well as a historical popularity of the entity with respect to the search query. Because the disclosed techniques enable a response to a search query to be generated based, at least in part, on the intent of the search query, the associated response to that search query can be more appropriate and more informative relative to responses generated using prior art techniques. In particular, with the disclosed techniques, if a search query specifies a media title included in an out-of-catalog media category, then the query result can include an explanatory message related to the media title not being included in the relevant media catalog in addition to a list of similar in-catalog media titles. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical numbers(s) identifying the instance where needed.

System Overview

Figure 1:
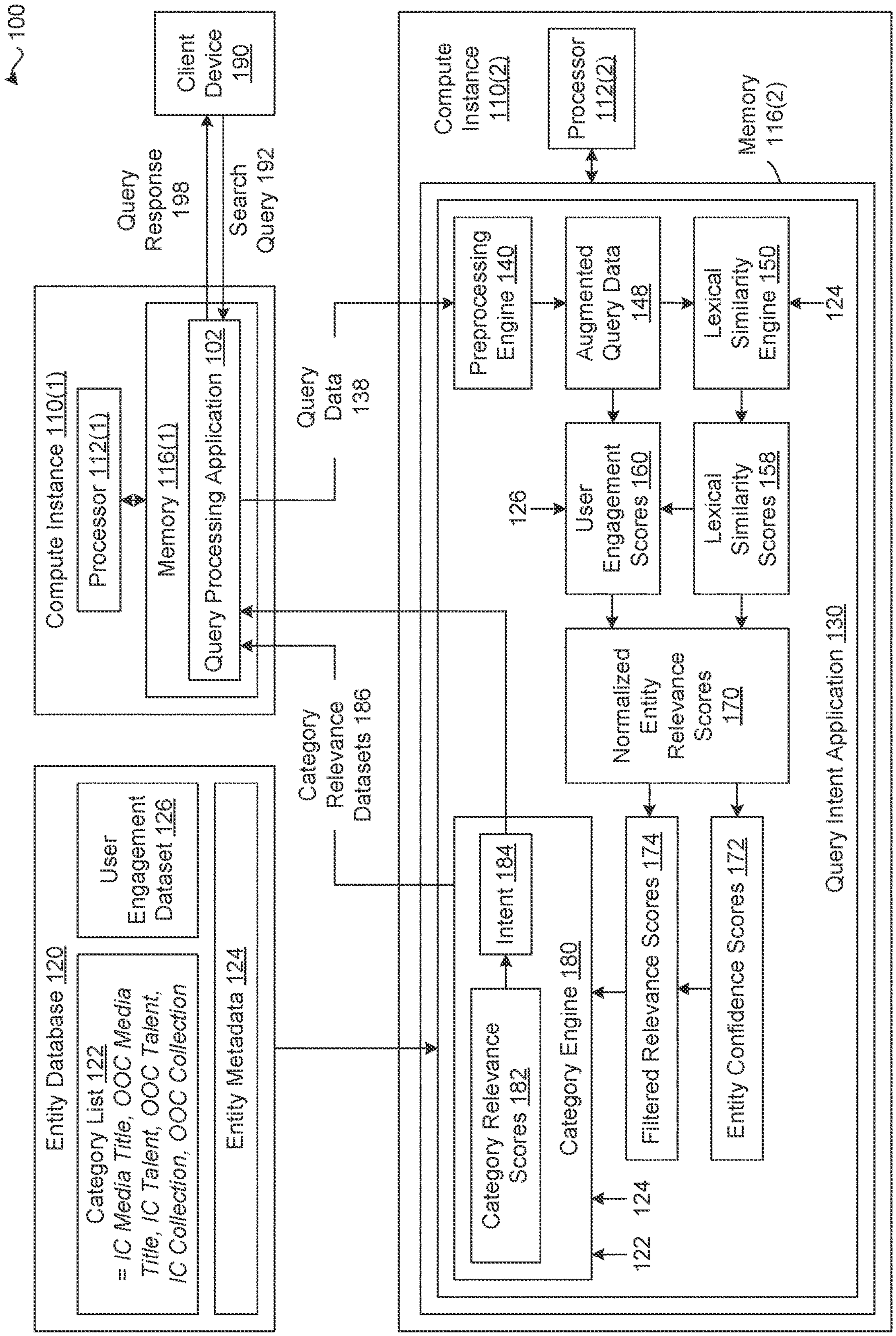
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a client device 190, a compute instance 110(1), a compute instance 110(2), and an entity database 120. For explanatory purposes, the compute instance 110(1) and the compute instance 110(2) are also referred to herein individually as "the compute instance 110" and collectively as "the compute instances 110."

In some other embodiments, the system 100 can omit the entity database 120, one or more of the compute instances 110, or any combination thereof. In the same or other embodiments, the system 100 can further include, without limitation, any number and/or types of other databases, one or more other compute instances, or any combination thereof.

The components of the system 100 can be distributed across any number of shared geographic locations and/or any number of different geographic locations and/or implemented in one or more cloud computing environments (i.e., encapsulated shared resources, software, data, etc.) in any combination.

The client device 190 can be any type of device that can be configured to stream media titles via a network connection (not shown) from a server (not shown) associated with a streaming media service. The client device 190 can playback a media title and receive input from one or more associated user(s) in any technically feasible fashion via any number and/or types of input devices, any number and/or types of output devices, any number and/or types of input/output devices, or any combination thereof.

As shown, the compute instance 110(1) includes, without limitation, a processor 112(1) and a memory 116(1) and the compute instance 110(2) includes, without limitation, a processor 112(2) and a memory 116(2). For explanatory purposes, the processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116." Each compute instance (including the compute instances 110) can be implemented in a cloud computing environment, implemented as part of any other distributed computing environment, or implemented in a standalone fashion.

The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. The memory 116 can be one or more of a readily available memory, such as random-access memory, read only memory, floppy disk, hard disk, or any other form of digital storage, local or remote.

In some other embodiments, any number of compute instances can include any number of processors and any number of memories in any combination. In particular, any number of compute instances (including zero or more of the compute instances 110) can provide a multiprocessing environment in any technically feasible fashion.

In some embodiments, a storage (not shown) may supplement or replace the memory 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

In general, each compute instance (including the compute instances 110) is configured to implement one or more software applications. For explanatory purposes only, each software application is described as residing in the memory 116 of a single compute instance and executing on the processor 112 of the same compute instance. However, in some embodiments, the functionality of each software application can be distributed across any number of other software applications that reside in the memories of any number of compute instances and execute on the processors of any number of compute instances in any combination. Further, subsets of the functionality of multiple software applications can be consolidated into a single software application.

In particular, the compute instance 110(1) is configured to generate query responses to search queries associated with exploring a catalog of media titles provided by the streaming media service and received from the client device 190 and any number of other client devices (not shown). As a user enters an intended search query via a GUI (not shown) displayed via a client device, each keystroke generates a new search query and responses to each search query are interactively displayed via the GUI. Because the responses to search queries directly impact the ability of a given user to select a media title of interest to that user, responding appropriately and informatively to each search query is an important aspect of the overall media streaming experience.

As described previously herein, in one conventional approach to responding to a search query, a search engine computes lexical scores between the search query and each media title in a catalog based on the TF-IDF scores of each word in the search query. The search engine generates a query response that specifies one or more of the highest scoring media titles. One drawback of such a conventional approach is that a significant percentage of search queries issued by users exploring a catalog of media titles in order to identify an entertaining media title are not lexically related to a media title in the catalog. In such situations, the query response can be uninformative and can be perceived as inappropriate and/or inaccurate by the user.

Inferring Intents of Search Queries Associated with Media Titles

To address the above problems, the system 100 includes, without limitation, a query intent application 130 and a query processing application 102. As described in greater detail below, the query intent application 130 infers the intents of search queries and the query processing application 102 generates responses to search queries based, at least in part, on the intents of the search queries. To infer the intent of a search query, the query intent application 130 computes entity relevance scores across a variety of categories associated with any number of characteristics of in-catalog items and out-of-catalog items. Each entity relevance score reflects both a measure of lexical similarity between a different entity and the search query as well as a historical popularity of the entity with respect to the search query. The query intent application 130 computes a different category relevance score for each category based on the associated entity relevance scores. Subsequently, the query intent application 130 sets the intent of the search query based on the category having the highest lexical score(s).

For explanatory purposes, the functionality of the query intent application 130 and the query processing application 102, and the amount and types of data stored in the entity database 120 are described below in the context of exploring a catalog of media titles associated with a streaming media service. Note, however, that the techniques described herein are illustrative rather than restrictive. Many modifications and variations will be apparent to those of ordinary skill in the art without departing from the scope and spirit of the described embodiments and techniques. In particular, the techniques described herein in the context of exploring a catalog of media titles can be applied to exploring a catalog of any number and/or types of items.

As shown, the query processing application 102 resides in the memory 116(1) of the compute instance 110(1) and executes on the processor 112(1) of the compute instance 110(1). The query processing application 102 processes search queries associated with a catalog of media titles that are received from the client device 190 and any number of other client devices (not shown). The query intent application 130 resides in the memory 116(2) of the compute instance 110(2) and executes on the processor 112(2) of the compute instance 110(2). The query intent application 130 computes intents and category-specific relevance data associated with search queries based on the entity database 120, the search queries, and optionally contextual information associated with the search queries.

Figure 2:
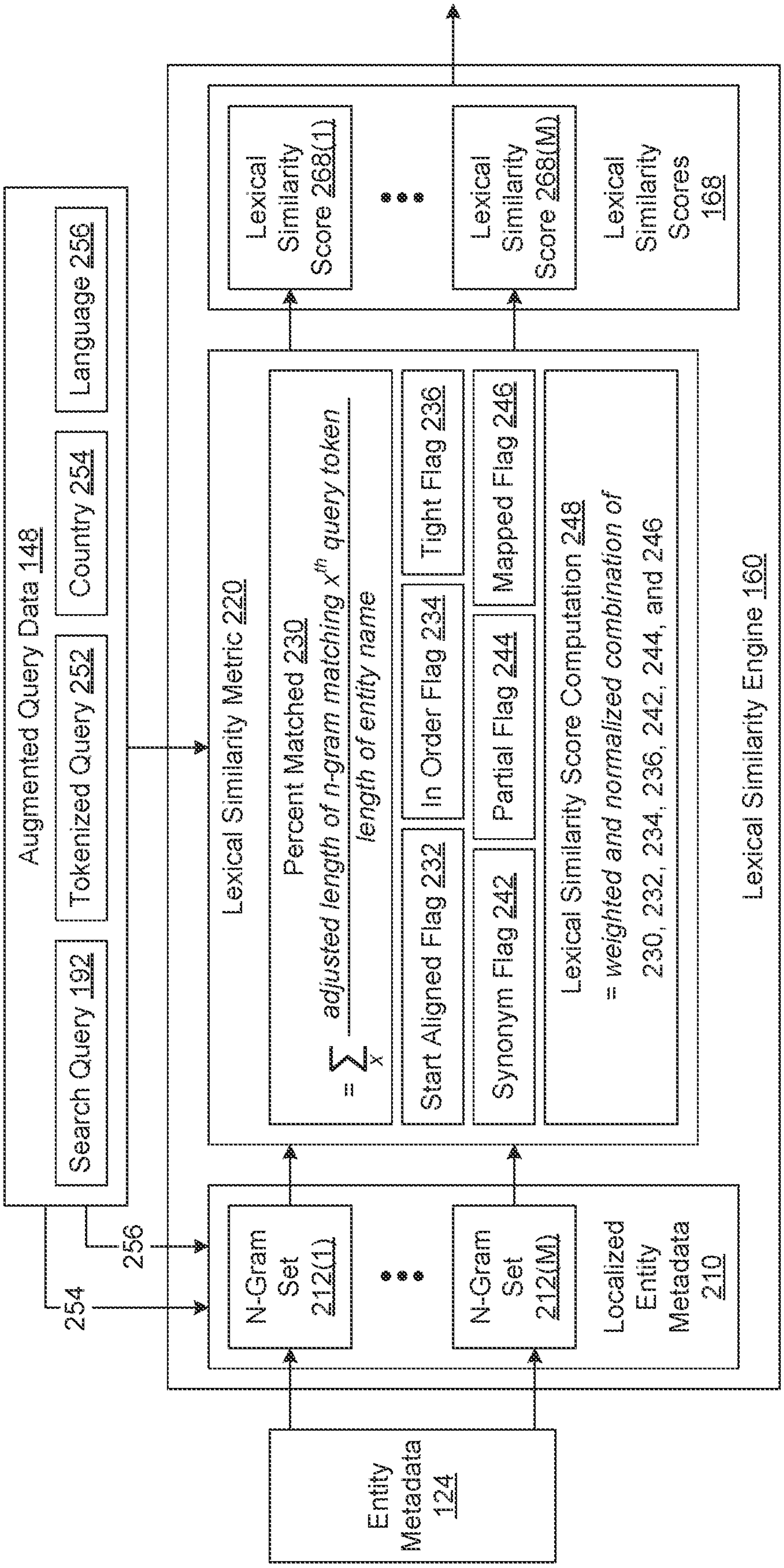
FIG. 2 is a more detailed illustration of the lexical similarity engine of FIG. 1, according to various embodiments.

For explanatory purposes, the functionality of the query intent application 130 and the query processing application 102 is described in detail in FIGS. 1 and 2 in the context of processing a search query 192 that is received from the client device 190. The search query 192 is generated as a user enters an intended search query via a GUI (not shown) that is associated with a streaming media service and displayed via the client device 190. The GUI provides a variety of mechanisms to enable a user to select a media title of interest to the user from a catalog of media titles and to control the playback of the selected media title for viewing. The search query 192 can include any part (including all) of the intended search query.

Upon receiving the search query 192, the query processing application 102 geneates query data 138 and transmits the query data 138 to the query intent application 130. The query data 138 includes the search query 192 and any amount (including none) and/or types of contextual data associated with the search query 192. In some embodiments, the contextual data includes a country and a language. As shown, the query intent application 130 generates an intent 184 and category relevance datasets 186 based on the search query 192 and the entity database 120.

The entity database 120 represents any number and/or types of entities associated with media titles. Some examples of types of entities are media title, talent, and collection. As used herein, talent can refer to any person associated with the production of a media title (e.g., actors, actresses, directors, producers), and collection can refer to any group of media titles sharing one or more specific characteristics (e.g., genres). As used herein, if a media title is included in the catalog of media titles, then the media title is also referred to as an "in-catalog" or "IC" media title. Otherwise, the media title is also referred to as an out-of-catalog or "OOC" media title. Further, if an entity is represented in the catalog of media titles, then the entity is also referred to as an IC entity. Otherwise, the entity is also referred to as an OOC entity.

As shown, the entity database 120 includes, without limitation, a category list 122, entity metadata 124, and user engagement dataset 126. The category list 122 specifies any number and/or types of categories that are associated with any number of characteristics of any number of in-catalog media titles and any number of out-of-catalog titles. Each of the categories specified in the category list 122 is associated with a different intent. An intent associated with a category is also referred to herein as a "category intent." Each entity represented in the entity database 120 is assigned to a single category in the category list 122.

As shown, in some embodiments, the category list 122 includes an IC media title category, an OOC media title category, an IC media talent category, an OOC talent category, an IC collection category, and an OOC category. The IC media title category includes IC media titles and is associated with a category intent of watching an IC media title that is associated with a search query. The OOC media title category is associated with a category intent of exploring IC media titles that are similar to an OOC media title that is associated with a search query.

The IC talent category is associated with a category intent of watching an IC media title that is associated with a person (e.g., actor, director) associated with a search query. The OOC talent category is associated with a category intent of exploring IC media titles that are similar to media titles that are associated with an OOC person associated with a search query. The IC collection category is associated with a category intent of watching an IC media title that is included in a IC collection (e.g., genre) associated with a search query. The OOC collection category is associated with a category intent of exploring IC media titles that are similar to media titles that are associated with an OOC collection associated with a search query.

For each entity represented in the entity database 120, the entity metadata 124 specifies an entity name, a tokenized entity name, and optionally any amount and/or types of other data that can be used to facilitate any types of search operations, retrieval operations, comparison operations, or any combination thereof. The tokenized entity names are the results of executing zero or more lexical modification operations on the entity name. As used herein, "lexical" modification operations include any number and/or types of operations that modify text to facilitate indexing operations, search operations, retrieval operations, comparison operations, or any combination thereof. Some examples of lexical operations include tokenization operations (e.g., partitioning text into tokens), normalization operations (e.g., lowercasing operations), stemming operations (e.g., reducing a derived word to a base form), filtering operations (e.g., removing punctuation marks), spelling correction operations, and synonym expansion operations (e.g., indicating synonyms for tokens).

The user engagement dataset 126 specifies historical popularity of each entity with respect to any number and/or types of search queries, tokenized queries, or both. As used herein, a "tokenized query" is the result of executing zero or more lexical modification operations on a search query. For explanatory purposes, "queries" as used herein can refer to search queries, tokenized queries, or both. The historical popularity of a given entity with respect to a given query is specified via one or more historical engagement scores, where each historical engagement score reflects a level of user engagement (e.g., interactions) with the entity after issuing the query in a different context. Some examples of different contexts are different combinations of language and country.

To increase accuracy and consistency when inferring intents of search queries, interactions attributed to a given query are also attributed to any prefixes of the query. For example, interactions attributed to any of the following queries "game of", "game of t", "game of th", "game of thr", "game of thro", "game of thron", "game of throne", "game of thrones", "game of tho", and "game of thornes", "game of thrown" would also be attributed to the query "game of".

As shown, the query intent application 130 includes, without limitation, a preprocessing engine 140, a lexical similarity engine 150, and a category engine 180. The preprocessing engine 140 performs any number and/or types of lexical modification operations on the search query 192 to generate a corresponding tokenized query (not shown). The preprocessing engine 140 adds the tokenized query to the query data 138 to generate augmented query data 148. As described in greater detail below in conjunction with FIG. 2, in some embodiments, the augmented query data 148 includes the search query 192, the tokenized query, a country, and a language.

As shown, the lexical similarity engine 150 computes lexical similarity scores 158 based on the augmented query data 148 and the entity metadata 124. The lexical similarity scores 158 include a different lexical similarity score between the tokenized query and the tokenized entity name of each of any number of the entities represented by the entity database 120 that accounts for any contextual information (e.g., a county, a language). Accordingly, each lexical similarity score included in the lexical similarity scores 158 is associated with a different entity.

Each lexical similarity score is a value for a lexical similarity metric that measures a degree of lexical similarity between two textual items. Notably, a lexical similarity score of zero between two textual items indicate that the two textual items are not lexically related. The lexical similarity engine 150 can implement any type of lexical similarity metric in any technically feasible fashion. As described in greater detail below in conjunction with FIG. 2, in some embodiments, the lexical similarity engine 150 computes a lexical similarity score based on a weighted and normalized combination of a percent matched, boolean values of arrangement-related similarity attributes, and boolean values of quality-related similarity attributes.

As shown, the query intent application 130 generates user engagement scores 160 based on the augmented query data 148, the user engagement dataset 126, and the lexical similarity scores 158. More specifically, for each non-zero lexical similarity score included in the lexical similarity scores 158, the query intent application 130 determines a user engagement score for the augmented query data 148 with respect to the associated entity based on the user engagement dataset 126.

A user engagement score for the augmented query data 148 with respect to an entity is also referred to herein as a user engagement score associated with both the search query 192 and the entity. A user engagement score associated with both the search query 192 and an entity indicates a historical level of user engagement associated with the entity with respect the search query 192 and optionally any amount and/or types of contextual data (e.g., the country 254, the language 256) associated with the search query.

As persons skilled in the art will recognize, the likelihood that a given entity is relevant to the search query 192 in the associated context is influenced by both the associated lexical similarity score and the associated user engagement score. Importantly, the query intent application 130 accounts for both the lexical similarity scores 158 and the user engagement scores 160 when computing normalized entity relevance scores 170. The normalized entity relevance scores 170 include a different normalized entity relevance score between the search query 192 in the associated context and each entity associated with a non-zero lexical similarity score. The normalized entity relevance score associated with the search query 192 and a given entity estimate a relevance of the entity to the search query 192.

As shown, the query intent application 130 generates the normalized entity relevance scores 170 based on the augmented query data 148, the user engagement dataset 126, and the lexical similarity scores 158. To generate the normalized entity relevance scores 170, the query intent application 130 computes an entity relevance score for each entity associated with a non-zero lexical similarity score based on the lexical similarity score and the user engagement score associated with the entity. The query intent application 130 then normalizes the resulting entity relevance scores such that the sum of the entity relevance scores is equal to 1.0.

The query intent application 130 can compute an entity relevance score between the search query 192 and a given entity based on the lexical similarity score associated with the given entity and the user engagement score associated with the given entity in any technically feasible fashion. In some embodiments, the query intent application 130 applies a blending function to the lexical similarity score and the user engagement score to compute the entity relevance score. In particular, in some embodiments, the query intent application 130 uses a bivariate quadratic function with phenomenological weights as the blending function.

For instance, in some embodiments, the query intent application 130 computes an entity relevance score associated with both the query data 138 (denoted as Q) and an entity (denoted as e) based on the following equation (1):

$$R(Q, e) = c0 + c1 * L(Q, e) + c2 * B(Q, e) + c3 * L(Q, e) * B(Q, e) + c4 * L(Q, e) * L(Q, e) + c5 * B(Q, e) * B(Q, e) \quad (1)$$

In equation (1), R(Q, e) denotes a relevance score associated with both Q and e, L(Q, e) denotes a lexical similarity score associated with both Q and e, B(Q, e) denotes a user engagement score associated with both Q and e, and c0-c5 denote phenomenological weights. The phenomenological weights c0-c5 can be determined in any technically feasible fashion (e.g., fitted or learned from experiments). In some embodiments, the phenomenological weights c0, c1, c2, c3, and c5 are zero and the phenomenological weight c3 is one and therefore equation (1) becomes R(Q, e)=L(Q, e)*B(Q, e).

In some other embodiments, the query intent application 130 can train a machine learning model to combine features associated with a corresponding lexical similarity score and a user engagement score to generate lexical similarity score. Subsequently, the query intent application 130 can use the trained machine learning model to generate the normalized entity relevance scores 170 based on the lexical similarity scores 158 and the user engagement scores 160.

As persons skilled in the art will recognize, if the search query 192 is relatively broad (e.g., the search query 192 is "horror"), then the normalized entity relevance scores 170 often include many similar normalized relevance scores. Conversely, if the search query 192 is relatively narrow (e.g., the search query 192 is "squid gam"), then the normalized entity relevance scores 170 often include a few relatively high normalized relevance scores and many relatively low normalized relevance scores.

To systematically discard relatively low normalized entity relevance scores, the query intent application 130 converts the normalized entity relevance scores 170 to the entity confidence scores 172. The entity confidence scores 172 therefore include a different entity confidence score for each entity relevance score included in the normalized entity relevance scores 170. The query intent application 130 then filters the normalized entity relevance scores 170 scores based on the entity confidence scores 172 to generate the filtered relevance scores 174.

More precisely, for each normalized entity relevance score included in the normalized entity relevance scores 170, the query intent application 130 sets a corresponding entity confidence score equal to the sum of the normalized entity relevance score and a subset of the normalized entity relevance scores 170 that are less than the normalized entity relevance score. Accordingly, the query intent application 130 converts the highest of the normalized entity relevance scores 170 to an entity confidence score of 1.0.

As persons skilled in the art will recognize, if the entity confidence scores 172 are sorted in descending order, then the speed with which the resulting sorted entity confidence scores drop is likely to correlate to the breadth of the search query 192. For example, if the search query 192 is relatively broad, then the sorted entity confidence scores are likely to drop relatively slowly. By contrast, if the search query 192 is relatively narrow, then the sorted entity confidence scores are likely to drop relatively quickly.

For each of the entity confidence scores 172 that is less than a minimum confidence threshold (e.g., 0.98), the query intent application 130 removes the corresponding normalized entity relevance score from the normalized entity relevance scores 170 to generate the filtered relevance scores 174. In this fashion, the query intent application 130 systematically discards relatively low normalized entity relevance scores. Consequently, the entities associated with the filtered relevance scores 174 represent entities having a relative high relevance to the search query 192.

As used herein, relevance scores, normalized relevance scores, and filtered relevance scores are different types of relevance scores. For explanatory purposes, normalized relevance scores and filtered relevance scores are also referred to herein individually as a "relevance score" collectively as "relevance scores."

As shown, the category engine 180 determines the intent 184 and generates category relevance datasets 186 based on the filtered relevance scores 174, the category list 122, and the entity metadata 124. The intent 184 is associated with the augmented query data 148 and therefore the search query 192. The category engine 180 includes, without limitation, category relevance scores 182 and the intent 184. As described previously herein, each entity represented by the entity metadata 124 is assigned to exactly one of the categories in the category list 122. And because each relevance score—irrespective of the type of the relevance score—is associated with an entity that is assigned to a category, each relevance score is also associated with a category.

The category relevance scores 182 include a different category relevance score for each category included in the category list 122, where each category relevance score is associated with both the query data 138 (and therefore the search query 192) and a different category. For each category included in the category list 122, the category engine 180 computes the associated category relevance score associated with both the query data 138 and the category based on the subset of the filtered relevance scores 174 that are associated with entities assigned to the category.

In some embodiments, to compute the category relevance score associated with both the query data 138 (denoted as Q) and a category denoted as c, the category engine 180 selects each filtered relevance score that is both included in filtered relevance scores and associated with the first category. The category engine 180 then executes a summation operation across the selected filtered relevance scores. The result of the summation operation is the category relevance score associated with both Q and c that is denoted herein as S(Q, c).

In some embodiments, to compute the category relevance score associated with both the query data 138 (denoted as Q) and a category denoted as c, the category engine 180 computes a category relevance score associated with Q and c using equation (2) as follows:

$$S(Q, c) = \sum\nolimits_{r\, in\, 174} r(Q, e)\delta(e, c) \quad (2)$$

In equation (2), S(Q, c) denotes the category relevance score associated with Q and c, r(Q, e) denotes the normalized relevance score that is included in the filtered relevance score 174 and is associated with Q and an entity denoted as e, and δ(e, c) denotes a Kronecker delta. The Kronecker delta δ(e, c) is equal to 1 when the entity e is assigned to the category c and is equal to 0 when the entity e is not assigned to the category c.

The category engine 180 selects the category having the highest category relevance score and generates the intent 184 based on the intent associated with the selected category and optionally one or more entities associated with the selected category. In this fashion, the intent 184 reflects the category intent associated with the category having the highest category relevance score and optionally one or more entities associated with the category having the highest category relevance score.

For instance, if the category relevance score associated with both the search query 192 and the IC talent category is greater than each of the five other category relevance scores, then the category engine 180 selects the IC talent category. And if the selected category is the IC talent category, then the category engine 180 generates the intent 184 of watching an IC movie title associated with the person having the highest normalized relevance score within the IC talent category.

As shown, the category engine 180 transmits the intent 184 and category relevance datasets 186 to the query processing application 102. The category relevance datasets 186 include a different category relevance dataset for each of the categories included in the category list 122. To generate a category relevance dataset for a category c, the category engine 180 sorts the subset of the filtered relevance scores 174 that are associated with entities assigned to the category c in descending order to generate a sorted relevance score list for the category c. The category engine 180 then generates the category relevance dataset that specifies the category relevance score for the category c, the sorted relevance score list for the category c, and a ranked entity list that identifies the entities associated with normalized entity relevance scores specified in the sorted relevance score list.

The query processing application 102 generates the query response 198 based, at least in part, on the intent 184 and optionally the category relevance datasets 186. The query processing application 102 can perform any number and/or types of sorting operations, other organization operations, filtering operations, other modification operations, or any combination thereof on any amount and/or types of data generated in any technically feasible fashion based on the intent 184, the category relevance datasets 186, the search query 192, or any combination thereof to generate at least a portion of the query response 198.

For instance, in some embodiments, the query processing application 102 can generate a recommendation for one or more media titles based on the intent 184 and optionally any portion of the category relevance datasets 186, perform one or more organizational operations on a search result associated with the search query 192 based on the intent 184 and optionally any portion of the category relevance datasets 186, generate a message indicating that a media title associated with the search query is unavailable based on the intent 184 and optionally any portion of the category relevance datasets 186, perform any number and/or types of other operations relevant to the search query 192 based on the intent 184 and optionally any portion of the category relevance datasets 186, or any combination thereof to generate at least a portion of the query response 198.

The query response 198 can include any number and/or types of informative messages, recommendations of media titles included in the catalog, search results that specify any number and/or types of media titles, other informative data relevant to the search query 192, or any combination thereof. Further, any portion (including none or all) of the query response 198 can be generated and/or organized based on the intent 184 and/or any portion of the category relevance datasets 186.

Advantageously, because the disclosed techniques enable a response to a search query to be generated based, at least in part, on the intent of the search query, the associated response to that search query can be more appropriate and more informative relative to responses generated using prior art techniques. For example, if the intent 184 is to explore IC media titles that are similar to an OOC media title having the highest normalized relevance score, then the query processing application 102 can generate a query response 198 indicating that the OOC media title associated with the search query 192 is unavailable and specifying one or more recommended IC media titles. The query processing application 102 can determine the recommended IC media title(s) in any technically feasible fashion. For instance, in some embodiments, the query processing application 102 can directly or indirectly execute a recommendation engine based on the OOC media title having the highest normalized relevance score to determine the recommended IC media title(s).

In another example, the query processing application 102 can indirectly or directly execute one or more search algorithms based on the query data 138 to generate search results. The query processing application 102 can organize the search results based on the intent 184 and optionally one or more additional intents associated with categories having relatively high category relevance scores. In a more specific example, if the search query 192 is "irish," then the intent 184 could be to watch the IC media title "The Irishman," and the category relevance datasets 186 could indicate that the second highest category relevance score is associated with the genre of Irish movies. The query processing application 102 could explicitly organize the search results into IC movie titles associated with "The Irishman" and IC movie titles associated with the genre Irish movies in order to more comprehensively and descriptively address the search query 192.

It will be appreciated that the system 100 shown herein is illustrative and that variations and modifications are possible. For example, the functionality provided by the query processing application 102 and the query intent application 130 as described herein can be integrated into or distributed across any number of software applications (including one), and any number of components of the system 100. In particular, in some embodiments, the functionality provided by the query processing application 102 and the query intent application 130 as described herein are integrated into a single software application referred to herein as an "intent-based query processing application." Further, the connection topology between the various units in FIG. 1 can be modified as desired.

Please note that the techniques described herein are illustrative rather than restrictive and can be altered without departing from the broader spirit and scope of the embodiments. Many modifications and variations on the functionality of the query processing application 102, the query intent application 130, the preprocessing engine 140, the lexical similarity engine 150, and the category engine 180 will be apparent to those of ordinary skill in the art without departing from the scope and spirit of the described embodiments.

Similarly, the storage, organization, amount, and/or types of data described herein are illustrative rather than restrictive and can be altered without departing from the broader spirit and scope of the embodiments. In that regard, many modifications and variations on the entity database 120, the category list 122, the entity metadata 124, and the user engagement dataset 126 as described herein will be apparent to those of ordinary skill in the art without departing from the scope and spirit of the described embodiments.

Computing Lexical Similarity Scores

FIG. 2 is a more detailed illustration of the lexical similarity engine 150 of FIG. 1, according to various embodiments. As shown, the lexical similarity engine 150 computes the lexical similarity scores 168 between the search query 192 and any number of entities based on the augmented query data 148 and the entity metadata 124. The augmented query data 148 includes, without limitation, the search query 192, a tokenized query 252, a country 254, and a language 256.

As described previously herein in conjunction with FIG. 1, the preprocessing engine 140 executes zero or more lexical modification operations on the search query 192 to generate the tokenized query 252. The country 254 and the language 256 are contextual data associated with the search query 192. In some other embodiments, any amount and/or types of contextual data can be associated with the search query 192 instead of or in addition to the country 254 and the language 256.

As shown, the lexical similarity engine 150 includes, without limitation, localized entity metadata 210, a lexical similarity metric 220, and the lexical similarity scores 168. The lexical similarity engine 150 filters the entity metadata 124 based on the country 254 and the language 256 to generate the localized entity metadata 210 representing M different entities, where M can be any positive integer.

As described previously herein in conjunction with FIG. 1, for each entity represented in the entity database 120, the entity metadata 124 specifies an entity name, a tokenized entity name, and optionally any amount and/or types of other data that can be used to facilitate any types of search operations, retrieval operations, comparison operations, or any combination thereof. In particular, the entity metadata 124 specifies, without limitation, an n-gram set for each of the entities represented in the entity database 120.

The localized entity metadata 210 includes an n-gram set 212(1)—an n-gram set 212(M). Each of the n-gram set 212(1)—the n-gram set 212(M) includes an entity name, a tokenized entity name, an original tokenized entity name, an n-gram subset for each token in the associated tokenized entity name, and optionally an n-gram subset for each of one or more synonyms for one or more of the tokens. The original tokenized entity name is the result of applying one or more tokenization operations to the entity name. The tokenized entity name is the result of applying zero or more other types of lexical modification operations to the original tokenized entity name. If no other types of lexical modification operations are performed on the original tokenized entry name, then the original tokenized entity name is the same as the original tokenized entity name. As referred to herein, the n-gram subset(s) associated with the $y^{th}$ token in a tokenized entity name correspond to the $y^{th}$ position of the tokenized entity name and the $y^{th}$ word in the entity name.

The n-gram subset for a token having C characters includes C different n-grams that are each associated with a different adjusted length, where C can be any positive integer. For an integer x from 1 through C, the $x^{th}$ n-gram is the first x letters of the token. Accordingly, if a tokenized entity name is "breaking bad," then an n-gram set includes a first n-gram subset corresponding to a first position and a second n-gram subset corresponding to a second position. The first n-gram subset includes b, br, bre, brea, break, breaki, breakin, and breaking. The second n-gram subset includes b, ba, and bad. As used herein, the adjusted length of an n-gram is the number of characters in the n-gram divided by the number of characters in the corresponding token in the tokenized entity name and multiplied by the number of characters in the corresponding token in the original tokenized entity name.

The lexical similarity metric 220 quantifies a degree of lexical similarity between a tokenized query and a sequence of one or more "matched" n-grams corresponding to different tokens in a tokenized entity name. Together, the tokenized query and a sequence of one or more "matched" n-grams are also referred to herein as a "match." The lexical similarity metric 220 is also referred to herein as an "n-gram query to entity match metric." A value of the lexical similarity metric 220 is also referred to herein as a "lexical similarity score." Each lexical similarity score is a weighted and normalized combination of a percent matched, boolean values of arrangement-related similarity attributes, and boolean values of quality-related similarity attributes.

As used herein, an arrangement-related similarity attribute associated with a match is an attribute that is associated with an arrangement of characters in the match. A quality-related similarity attribute associated with a match is an attribute that is associated with a level of completeness of the match and/or is associated with a modification to a word included in an entity name corresponding to the tokenized entity name.

As shown the lexical similarity metric 220 includes, without limitation, a percent matched 230, a start aligned flag 232, an in order flag 234, a tight flag 236, a synonym flag 242, a partial flag 244, a mapped flag 246, and a lexical similarity score computation 248. The percent matched 230 specifies a percentage of the characters that are matched, the start aligned flag 232, the in order flag 234, and the tight flag 236 are boolean values of arrangement-related similarity attributes. The synonym flag 242, the partial flag 244, and the mapped flag 246 are boolean values of quality-related similarity attributes.

The lexical similarity score computation 248 specifies how to compute a lexical similarity score of a match based on the percent matched 230, the start aligned flag 232, the in order flag 234, the tight flag 236, the synonym flag 242, the partial flag 244, and the mapped flag 246. In some other embodiments, the lexical similarity metric 220 can be computed based on any number and/or types of arrangement-related similarity attributes, quality-related similarity attributes, any other type of similarity attributes, or any combination thereof instead of or in addition to the start aligned flag 232, the in order flag 234, the tight flag 236, the synonym flag 242, the partial flag 244, the mapped flag 246, or any combination thereof.

The lexical similarity engine 150 can compute the percent matched 230 in any technically feasible fashion. In some embodiments, the lexical similarity engine 150 computes the percent matched 230 between tokens in a tokenized query and a sequence of one or more matched n-grams using the following equation (3):

$$percentMatched = \sum_{x=1}^{queryWordLen} \frac{adjustedNgramLen(x)}{entityNameLen} \tag{3}$$

In equation (3), percentMached denotes the percent matched 230, queryWordLen denotes the number of tokens in the tokenized query, entityNameLen denotes the number of characters in the tokenized entity name, and adjustedNgramLen(x) denotes the adjusted length of the n-gram matched to the $x^{th}$ token in the tokenized query. If the $x^{th}$ token in the tokenized query is not matched to an n-gram, then the adjustedNgramLen(x) is zero.

The start aligned flag 232 indicates whether the match is aligned to a first character of the search query 192. If the start aligned flag 232 is true, then the match starts from the first character of the search query 192. The first character is the leftmost character in English and many other languages, and the rightmost character in Arabic and some other languages. The in order flag 234 indicates whether the match is an in order match. If the in order flag 234 is true, then the order of the matched token(s) in the tokenized query and the order of the matched token(s) in the tokenized entity name are the same. The tightness flag 236 indicates whether the match includes one or more gaps relative to the first entity name. If the tightness flag 236 is true, then matched token(s) in the tokenized entity name correspond to consecutive positions without any gaps.

The synonym flag 242 indicates whether the match includes a synonym. If the synonym flag 242 is true, then the match involves one or more n-grams that are derived from synonyms of tokens in the tokenized entity name. The partial flag 244 indicates whether the match is a partial match. If the partial flag 244 is true, then one or more of the tokens in the tokenized query is a partial match to a corresponding token in the tokenized entity name. The mapped flag 246 indicates whether the match includes a modification relative to a word included in the entity name. If the mapped flag 246 is true, then an original tokenized entity name was mapped to the tokenized entity name via one or more normalization operations and/or lexical modification operations.

As shown, the lexical similarity score computation 248 specifies that a lexical similarity score is equal to a weighted and normalized combination of the percent matched 230, the start aligned flag 232, the in order flag 234, the tight flag 236, the synonym flag 242, the partial flag 244, and the mapped flag 246 for the tokenized query and the tokenized entity name. The lexical similarity engine 150 can determine the weights and implement the lexical similarity score computation 248 in any technically feasible fashion.

For instance, in some embodiments, the lexical similarity engine 150 determines the values of the weights based on configuration data (not shown) associated with the query intent application 130. In the same or other embodiments, the lexical similarity engine 150 computes the lexical similarity score denoted as lexicalSimilarityScore using the following equation (4):

$$lexicalSimialrityScore = (percentMatched * pw_1 + startAligned * pw_2 + inOrder * pw_3 + \text{tight} * pw_4 + \text{synonym} * nw_1 + \text{partial} * nw_2 + \text{mapped} * nw_3 - nw_1 - nw_2 - nw_3) \div (pw_1 + pw_2 + pw_3 + pw_4 - nw_1 - nw_2 - nw_3) \tag{4}$$

In equation (4), percentMatched, startAligned, inOrder, tight, synonym, partial, and mapped denote the percent matched 230, the start aligned flag 232, the in order flag 234, the tight flag 236, the synonym flag 242, the partial flag 244, and the mapped flag 246, respectively. Also in equation (4), $pw_1$, $pw_2$, $pw_3$, $pw_4$ denote weights having positive values and $nw_1$, $nw_2$, and $nw_3$ denote weights having negative values.

As shown, the lexical similarity scores 168 include, without limitation, a lexical similarity score 268(1)—a lexical similarity score 268(M). The lexical similarity engine 150 computes the lexical similarity score 268(1)—a lexical similarity score 268(M) based on the n-gram set 212(1)—the n-gram set 212(M), respectfully. The lexical similarity engine 150 determines any number of different sequences of n-grams from each of the n-gram set 212(1)—the n-gram set 212(M) that at least partially match the tokenized query 252. The lexical similarity engine 150 computes a different lexical similarity score between the tokenized query 252 and each sequence as per the lexical similarity metric 220. The lexical similarity engine 150 sets the lexical similarity score 268(1)—a lexical similarity score 268(M) equal to the maximum of the lexical similarity scores computed based on the n-gram set 212(1)—the n-gram set 212(M), respectfully.

The lexical similarity engine 150 can determine sequences of n-grams from the n-gram set 212(1)—the n-gram set 212(M) that at least partially match the tokenized query 252 and compute the corresponding lexical similarity scores in any technically feasible fashion. In some embodiments, the lexical similarity engine 150 directly or indirectly implements a positional matching algorithm to determine sequences of n-grams that at least partially match the tokenized query 252 and optionally associated lexical similarity scores.

For instance, in some embodiments, the lexical similarity engine 150 configures a search engine to execute a positional matching algorithm on the tokenized query 252 and each of the n-gram set 212(1)—the n-gram set 212(M) based on the lexical similarity metric 220 across different sets of matching options to determine lexical similarity scores for sequences of n-grams that at least partially match the tokenized query 252. An example of a search platform that can be configured to execute a positional matching algorithm is Apache Solr. Some examples of matching options are options corresponding to the start aligned flag 232, the in order flag 234, the tight flag 236, the synonym flag 242, the partial flag 244, or any combination thereof.

Please note that the techniques described herein are illustrative rather than restrictive and can be altered without departing from the broader spirit and scope of the embodiments. Many modifications and variations on the functionality of the lexical similarity engine 150 and to the lexical similarity metric 220, the entity metadata 124, and the n-gram set 212(1)—the n-gram set 212(M) will be apparent to those of ordinary skill in the art without departing from the scope and spirit of the described embodiments.

Figure 3:
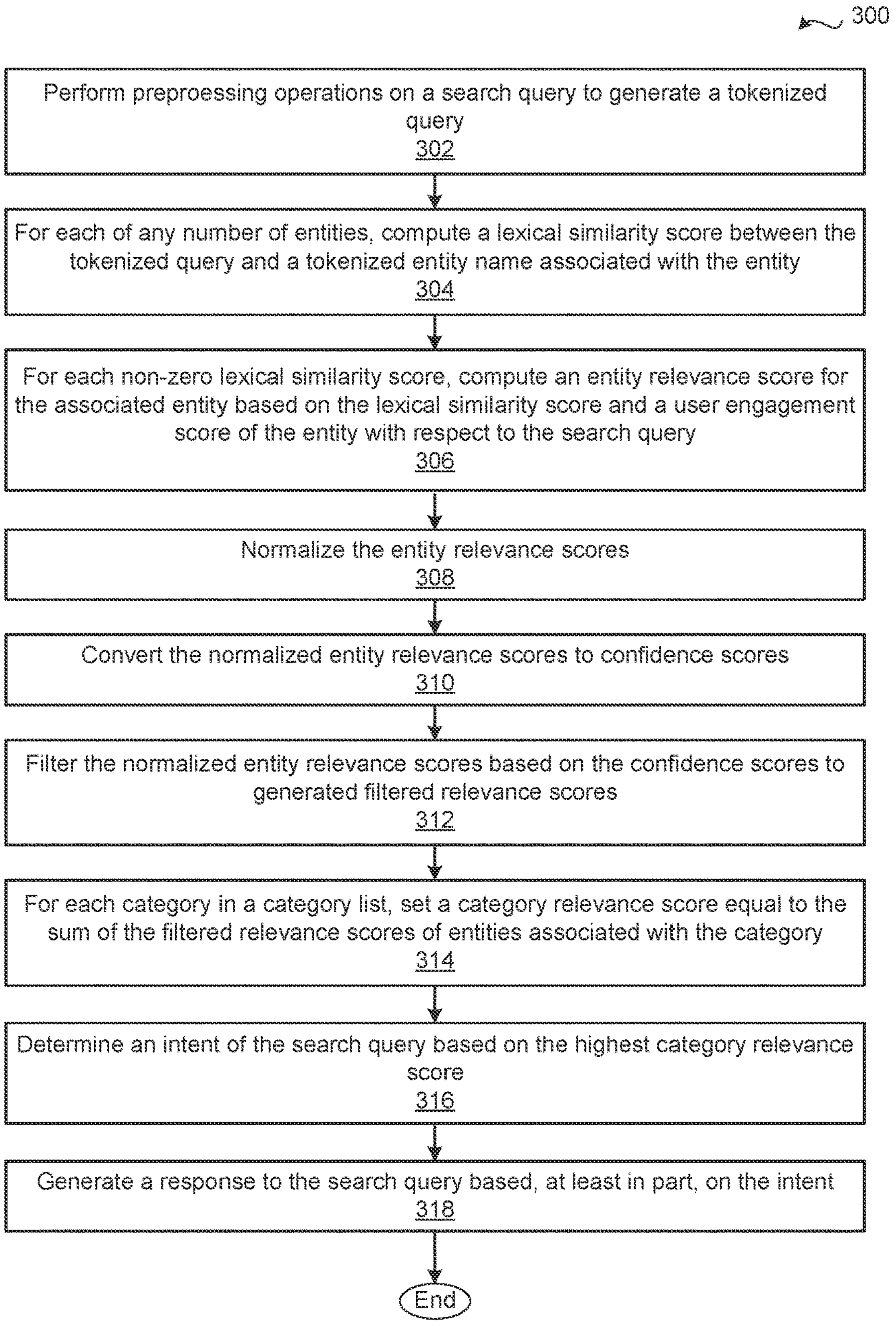
FIG. 3 is a flow diagram of method steps for processing search queries, according to various embodiments.

FIG. 3 is a flow diagram of method steps for processing search queries, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the query intent application 130 performs preprocessing operations on a search query to generate a tokenized query. At step 304, for each of any number of entities, the query intent application 130 computes a lexical similarity score between the tokenized query and a tokenized entity name associated with the entity. At step 306, for each non-zero lexical similarity score, the query intent application 130 computes an entity relevance score for the associated entity based on the lexical similarity score and a user engagement score of the associated entity with respect to the search query.

At step 308, the query intent application 130 normalizes the entity relevance scores. At step 310, the query intent application 130 converts the normalized entity relevance scores to confidence scores. At step 312, the query intent application 130 filters the normalized entity relevance scores based on the confidence scores to generated filtered relevance scores At step 314, for each category in a category list, the query intent application 130 sets a category relevance score equal to the sum of the filtered relevance scores of entities associated with the category. At step 316, the query intent application 130 determines an intent of the search query based on the highest category relevance score. At step 318, the query processing application 102 generates a response to the search query based, at least in part, on the intent. The method 300 then terminates.

In sum, the disclosed techniques can be used to generate responses to search queries that account for the intents of the search queries. In some embodiments, entity metadata associated with a catalog of media titles represents entities in an IC media title category, an OOC media title category, an IC talent category, an OOC talent category, an IC collection category, and an OOC collection category. For each entity, the entity metadata set specifies an entity name, an associated category, a tokenized entity name, and optionally any amount and/or types of data associated with any types of search algorithms. A user engagement dataset quantifies historical engagement-based popularity of each entity with respect to a wide variety of search queries.

A query processing application receives a search query from a client device and transmits the search query and associated contextual information (e.g., a country and a language) to a query intent application. The query intent application performs any number and/or types of lexical modification operations on the search query to generate a tokenized query. The query intent application determines a localized subset of the entity metadata based on the contextual information. The query intent application computes lexical similarity scores between the tokenized query and tokenized entity names of entities represented by the localized subset. Each lexical similarity score is a value for an N-gram query to entity match metric that is a weighted combination of a percentage matched, attributes associated with the arrangement of a match, and attributes associated with the quality of the matched terms.

For each entity associated with a non-zero lexical similarity score, the query intent application computes an entity relevance score based on the lexical similarity score and an engagement-based popularity of the entity with respect to the search query as per the user engagement dataset. The query intent application normalizes the entity relevance scores and then converts the normalized entity relevance scores into confidence scores. The query intent application filters-out any normalized entity relevance scores corresponding to confidence scores that are less than a minimum confidence threshold to generate filtered relevance scores.

For each category, the query intent application aggregates the filtered relevance scores for entities in the category to compute a category relevance score associated with both the search query and the category. The query intent application determines an intent of the search query based on the category associated with the highest category relevance score. For each category, the query intent application generates an associated category relevance dataset that includes the associated category relevance score and a list of the entities in the category having the highest normalized entity relevance scores and the associated normalized entity relevance scores. The query processing application generates a response to the search query based on search results from a search engine, the query intent, and optionally one or more of the category relevance datasets. Notably, the response to the search query can include a list of IC media titles organized in any technically feasible fashion, any number and/or types of explanatory messages, or any combination thereof.

At least one technical advantage of the disclosed techniques relative to the prior art is that, with the disclosed techniques, responses to search queries can account for the intents of those original search queries. In that regard, with the disclosed techniques, a category and an associated intent of a search query are automatically identified based on entity relevance scores across a variety of categories associated with any number of characteristics of in-catalog items and out-of-catalog items. Each entity relevance score reflects both a measure of lexical similarity between a different entity and the search query as well as a historical popularity of the entity with respect to the search query. Because the disclosed techniques enable a response to a search query to be generated based, at least in part, on the intent of the search query, the associated response to that search query can be more appropriate and more informative relative to responses generated using prior art techniques. In particular, with the disclosed techniques, if a search query specifies a media title included in an out-of-catalog media category, then the query result can include an explanatory message related to the media title not being included in the relevant media catalog in addition to a list of similar in-catalog media titles. These technical advantages provide one or more technological advancements over prior art approaches.

1. In some embodiments, a computer-implemented method for processing search queries comprises computing a plurality of lexical similarity scores between a search query and a plurality of entities; computing a plurality of entity relevance scores based on the plurality of lexical similarity scores and a plurality of user engagement scores associated with both the search query and the plurality of entities; computing a first category relevance score associated with both the search query and a first category based on the plurality of entity relevance scores; determining an intent associated with the search query based on the first category relevance score; and generating a response to the search query based on the intent.

2. The computer-implemented method of clause 1, wherein determining the intent associated with the search query comprises determining that the first category relevance score is greater than a second category relevance score associated with both the search query and a second category.

3. The computer-implemented method of clauses 1 or 2, wherein computing the plurality of lexical similarity scores comprises determining a first match based on the search query and a first entity name associated with a first entity included in the plurality of entities; and computing a first lexical similarity score based on the first match and at least a first similarity attribute associated with the first match.

4. The computer-implemented method of any of clauses 1-3, wherein the first similarity attribute indicates whether the first match is aligned to a first character of the search query, the first match is an in order match, the first match includes one or more gaps relative to the first entity name, the first match comprises a partial match, the first match includes a synonym, or the first match includes a modification relative to a word included in the first entity name.

5. The computer-implemented method of any of clauses 1-4, wherein a first user engagement score included in the plurality of user engagement scores indicates a historical level of user engagement associated with a first entity with respect to both the search query and contextual data associated with the search query.

6. The computer-implemented method of any of clauses 1-5, wherein the contextual data comprises at least one of a language or a country.

7. The computer-implemented method of any of clauses 1-6, wherein computing the first category relevance score comprises selecting each entity relevance score that is both included in the plurality of entity relevance scores and associated with the first category to generate a plurality of selected entity relevance scores; and executing a summation operation across the plurality of selected entity relevance scores.

8. The computer-implemented method of any of clauses 1-7, wherein generating the response to the search query comprises generating a message indicating that a first media title associated with the search query is unavailable.

9. The computer-implemented method of any of clauses 1-8, wherein generating the response to the search query comprising at least one of generating a recommendation of one or more media titles based on the intent or performing one or more organizational operations on a search result associated with the search query based on the intent.

10. The computer-implemented method of any of clauses 1-9, wherein the first category comprises an in-catalog media title category, an out-of-catalog media title category, an in-catalog talent category, an out-of-catalog talent category, an in-catalog collection, or an out-of-catalog collection.

11. In some embodiments, one or more non-transitory computer readable media include instructions that, when executed by one or more processors, cause the one or more processors to process search queries by performing the steps of computing a plurality of lexical similarity scores between a search query and a plurality of entities; computing a plurality of entity relevance scores based on the plurality of lexical similarity scores and a plurality of user engagement scores associated with both the search query and the plurality of entities; computing a first category relevance score associated with both the search query and a first category based on the plurality of entity relevance scores; determining an intent associated with the search query based on the first category relevance score; and generating a response to the search query based on the intent.

12. The one or more non-transitory computer readable media of clause 11, wherein determining the intent associated with the search query comprises determining that the first category relevance score is greater than a second category relevance score associated with both the search query and a second category.

13. The one or more non-transitory computer readable media of clauses 11 or 12, wherein computing the plurality of lexical similarity scores comprises determining a first match based on the search query and a first entity name associated with a first entity included in the plurality of entities; and computing a first lexical similarity score based on the first match and at least a first similarity attribute associated with the first match.

14. The one or more non-transitory computer readable media of any of clauses 11-13, wherein the first similarity attribute is associated with at least one of an arrangement of characters included in the first match, a level of completeness of the first match, or a modification to a word included in the first entity name.

15. The one or more non-transitory computer readable media of any of clauses 11-14, wherein a first user engagement score included in the plurality of user engagement scores indicates a historical level of user engagement associated with a first entity with respect to the search query.

16. The one or more non-transitory computer readable media of any of clauses 11-15, wherein computing the first category relevance score comprises selecting each entity relevance score that is both included in the plurality of entity relevance scores and associated with the first category to generate a plurality of selected entity relevance scores; and executing a summation operation across the plurality of selected entity relevance scores.

17. The one or more non-transitory computer readable media of any of clauses 11-16, wherein generating the response to the search query comprises generating a message indicating that a first media title associated with the search query is unavailable.

18. The one or more non-transitory computer readable media of any of clauses 11-17, wherein the intent reflects a category intent associated with the first category and a first entity associated with the first category.

19. The one or more non-transitory computer readable media of any of clauses 11-18, wherein the first category comprises an in-catalog media title category, an out-of-catalog media title category, an in-catalog talent category, an out-of-catalog talent category, an in-catalog collection, or an out-of-catalog collection.

20. In some embodiments, a system comprises one or more memories storing instructions and one or more processors coupled to the one or more memories that, when executing the instructions, perform the steps of computing a plurality of lexical similarity scores between a search query and a plurality of entities; computing a plurality of entity relevance scores based on the plurality of lexical similarity scores and a plurality of user engagement scores associated with both the search query and the plurality of entities; computing a first category relevance score associated with both the search query and a first category based on the plurality of entity relevance scores; determining an intent associated with the search query based on the first category relevance score; and generating a response to the search query based on the intent.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating intent-informed responses to search queries, the method comprising:

computing a plurality of lexical similarity scores between a search query and a plurality of entities;

computing a plurality of entity relevance scores based on the plurality of lexical similarity scores and a plurality of user engagement scores, wherein the plurality of user engagement scores is based on historical engagement data associated with both the search query and the plurality of entities;

computing a first category relevance score associated with both the search query and a first category, wherein each entity included in the plurality of entities is assigned to a category, and the first category relevance score is computed based on a subset of the plurality of entity relevance scores corresponding to entities that are assigned to the first category;

determining an intent associated with the search query based on the first category relevance score; and generating a response to the search query that includes a first message indicating that a first media title associated with the search query is not included in a first collection of media titles based on the intent and the first category relevance score.

2. The computer-implemented method of claim 1, wherein determining the intent associated with the search query comprises determining that the first category relevance score is greater than a second category relevance score associated with both the search query and a second category.

3. The computer-implemented method of claim 1, wherein computing the plurality of lexical similarity scores comprises:

determining a first match based on the search query and a first entity name associated with a first entity included in the plurality of entities; and computing a first lexical similarity score based on the first match and at least a first similarity attribute associated with the first match.

4. The computer-implemented method of claim 3, wherein the first similarity attribute indicates whether the first match is aligned to a first character of the search query, the first match is an in order match, the first match includes one or more gaps relative to the first entity name, the first match comprises a partial match, the first match includes a synonym, or the first match includes a modification relative to a word included in the first entity name.

5. The computer-implemented method of claim 1, wherein a first user engagement score included in the plurality of user engagement scores indicates a historical level of user engagement associated with a first entity with respect to both the search query and contextual data associated with the search query.

6. The computer-implemented method of claim 5, wherein the contextual data comprises at least one of a language or a country.

7. The computer-implemented method of claim 1, wherein computing the first category relevance score comprises:

selecting each entity relevance score that is both included in the plurality of entity relevance scores and associated with the first category to generate a plurality of selected entity relevance scores; and executing a summation operation across the plurality of selected entity relevance scores.

8. The computer-implemented method of claim 1, wherein generating the response to the search query comprises at least one of generating a recommendation of one or more media titles based on the intent or performing one or more organizational operations on a search result associated with the search query based on the intent.

9. The computer-implemented method of claim 1, wherein the first category comprises an in-catalog media title category, an out-of-catalog media title category, an in-catalog talent category, an out-of-catalog talent category, an in-catalog collection, or an out-of-catalog collection.

10. The computer-implemented method of claim 1, further comprising training a first machine learning model to combine a given plurality of lexical similarity scores and a given plurality of user engagement scores to generate a first trained machine learning model, wherein the plurality of entity relevance scores is computed based on a first combination of the plurality of lexical similarity scores and the plurality of user engagement scores generated by the first trained machine learning model.

11. One or more non-transitory computer readable media including instructions that, when executed by one or more processors, cause the one or more processors to generate intent-informed responses to search queries by performing the steps of:

computing a plurality of lexical similarity scores between a search query and a plurality of entities;

computing a plurality of entity relevance scores based on the plurality of lexical similarity scores and a plurality of user engagement scores, wherein the plurality of user engagement scores is based on historical engagement data associated with both the search query and the plurality of entities;

computing a first category relevance score associated with both the search query and a first category, wherein each entity included in the plurality of entities is assigned to a category, and the first category relevance score is computed based on a subset of the plurality of entity relevance scores corresponding to entities that are assigned to the first category;

determining an intent associated with the search query based on the first category relevance score; and generating a response to the search query that includes a first message indicating that a first media title associated with the search query is not included in a first collection of media titles based on the intent and the first category relevance score.

12. The one or more non-transitory computer readable media of claim 11, wherein determining the intent associated with the search query comprises determining that the first category relevance score is greater than a second category relevance score associated with both the search query and a second category.

13. The one or more non-transitory computer readable media of claim 11, wherein computing the plurality of lexical similarity scores comprises:

determining a first match based on the search query and a first entity name associated with a first entity included in the plurality of entities; and computing a first lexical similarity score based on the first match and at least a first similarity attribute associated with the first match.

14. The one or more non-transitory computer readable media of claim 13, wherein the first similarity attribute is associated with at least one of an arrangement of characters included in the first match, a level of completeness of the first match, or a modification to a word included in the first entity name.

15. The one or more non-transitory computer readable media of claim 11, wherein a first user engagement score included in the plurality of user engagement scores indicates a historical level of user engagement associated with a first entity with respect to the search query.

16. The one or more non-transitory computer readable media of claim 11, wherein computing the first category relevance score comprises:

selecting each entity relevance score that is both included in the plurality of entity relevance scores and associated with the first category to generate a plurality of selected entity relevance scores; and executing a summation operation across the plurality of selected entity relevance scores.

17. The one or more non-transitory computer readable media of claim 11, wherein the intent reflects a category intent associated with the first category and a first entity associated with the first category.

18. The one or more non-transitory computer readable media of claim 11, wherein the first category comprises an in-catalog media title category, an out-of-catalog media title category, an in-catalog talent category, an out-of-catalog talent category, an in-catalog collection, or an out-of-catalog collection.

19. A system, comprising:

one or more memories storing instructions; and one or more processors coupled to the one or more memories that, when executing the instructions, generate intent-informed responses to search queries, by performing the steps of:

computing a plurality of lexical similarity scores between a search query and a plurality of entities;

computing a plurality of entity relevance scores based on the plurality of lexical similarity scores and a plurality of user engagement scores, wherein the plurality of user engagement scores is based on historical engagement data associated with both the search query and the plurality of entities;

computing a first category relevance score associated with both the search query and a first category, wherein each entity included in the plurality of entities is assigned to a category, and the first category relevance score is computed based on a subset of the plurality of entity relevance scores corresponding to entities that are assigned to the first category;

determining an intent associated with the search query based on the first category relevance score; and generating a response to the search query that includes a first message indicating that a first media title associated with the search query is not included in a first collection of media titles based on the intent and the first category relevance score.

* * * * *